United States Patent [19]

Baucke et al.

[11] Patent Number: 5,069,535

[45] Date of Patent: * Dec. 3, 1991

[54] ELECTROCHROMIC LAYER-SET

[75] Inventors: Friedrich G. K. Baucke, Mainz; Jutta Braun, Flörsheim; Bernd Metz, Mainz, all of Fed. Rep. of Germany

[73] Assignee: Schott Glaswerke, Mainz, Fed. Rep. of Germany

[*] Notice: The portion of the term of this patent subsequent to Nov. 27, 2007 has been disclaimed.

[21] Appl. No.: 529,419

[22] Filed: May 29, 1990

Related U.S. Application Data

[63] Continuation of Ser. No. 261,526, Oct. 24, 1988, Pat. No. 4,973,141.

[30] Foreign Application Priority Data

Oct. 24, 1987 [DE] Fed. Rep. of Germany ....... 3736075

[51] Int. Cl.$^5$ ................................................ G02F 1/01
[52] U.S. Cl. ..................................... 359/273; 359/265
[58] Field of Search ........................................ 350/357

[56] References Cited

U.S. PATENT DOCUMENTS

| | | | |
|---|---|---|---|
| 3,971,624 | 7/1976 | Bruesch et al. | 350/357 |
| 3,975,086 | 8/1976 | Leibowitz | 350/357 |
| 4,762,401 | 8/1988 | Baucke et al. | 350/357 |
| 4,909,610 | 3/1990 | Baucke et al. | 350/357 |
| 4,973,141 | 11/1990 | Baucke et al. | 350/357 |

Primary Examiner—Rolf Hille
Assistant Examiner—Mahshid Saadat
Attorney, Agent, or Firm—Millen, White & Zelano

[57] ABSTRACT

An electrochromic layer-set, operating with hydrogen, comprises a transparent substrate front face plate, at least two electrodes, at least one electrochromic layer, a hydrogen ion-storing layer, a hydrogen ion-conducting layer, a rear face in sealing relationship with the layer-set, directly following one of the two electrodes, there being a metallic layer between the rear face and the layer lying in front of the rear face (the electrode) or the rear face itself is formed by this metallic layer. The side of the metallic layer turned away from the substrate plate is optionally transformed into the oxide of the metal. For the application of such a metallic layer, the layer-set and a counter-electrode are immersed in an electrolyte containing the metal ions, with the electrode lying at the rear face of the layer-set being made the negative electrode.

20 Claims, 1 Drawing Sheet

DARKENING

BRIGHTENING

COLORLESS                                                 BLUE

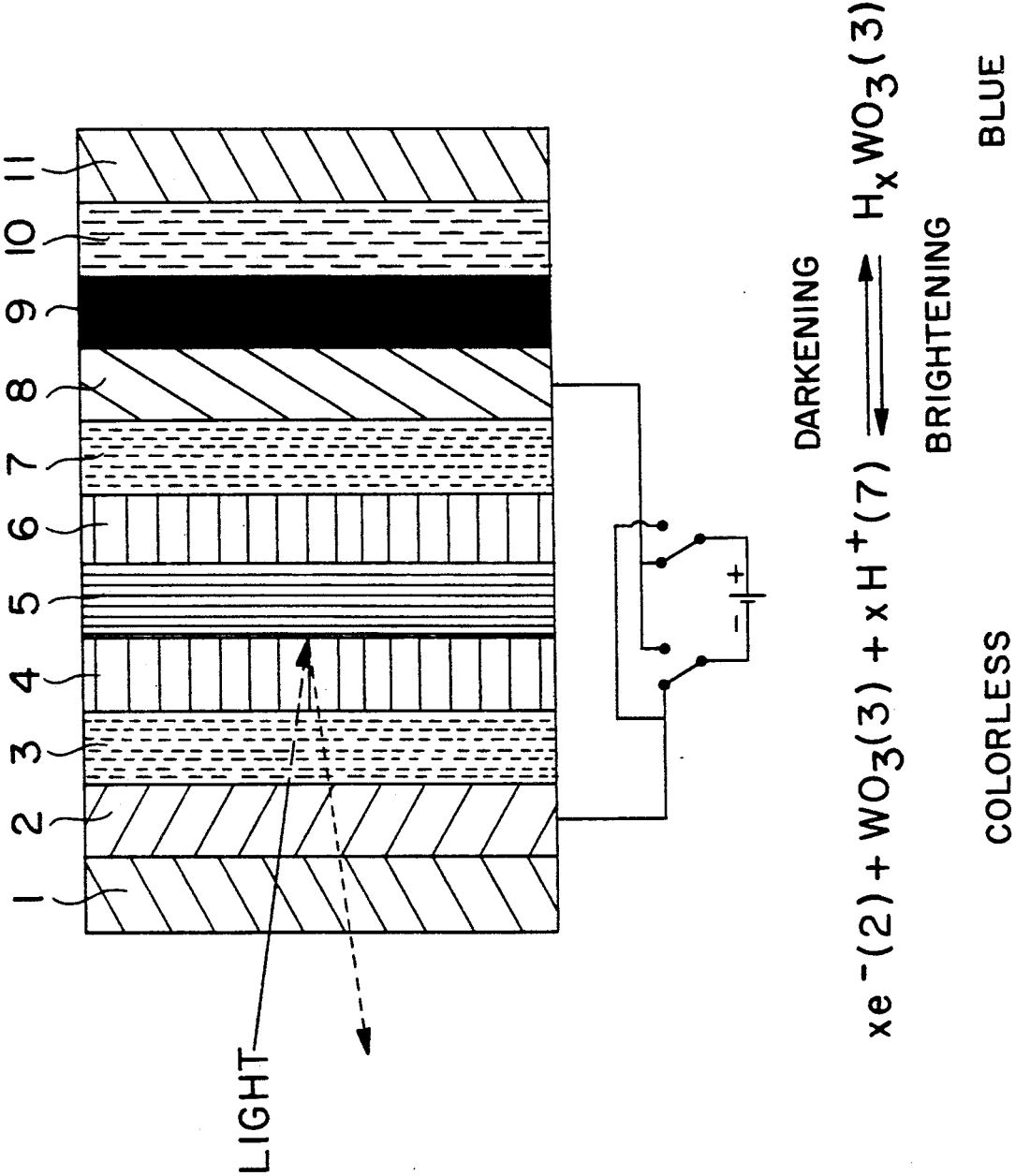

ELECTROCHROMIC LAYER-SET

This is a continuation of application Ser. No. 07/261,526, filed Oct. 24, 1988, now U.S. Pat. No. 4,973,141, issued Nov. 27, 1990.

CROSS-REFERENCE TO RELATED APPLICATION

This invention is related to a commonly assigned application by Friedrich G. K. Baucke and Jutta Braun entitled, "Process for Charging an Electrochromic System with Hydrogen" Ser. No. 07/261,527, filed Oct. 31, 1988, now U.S. Pat. No. 4,909,610, issued Mar. 30, 1990.

BACKGROUND OF THE INVENTION

The present invention relates in general to electrochromic layer-sets, especially those operating with hydrogen. Such layer sets are also referred to as electrochromic layered packages as well as electrochromic composites or laminates. A conventional species of such layer-sets is an electrochromic mirror.

Electrochromic layer-sets, when based on hydrogen ion transport, have generally comprised, a transparent substrate plate being arranged on the front face of the layer-set, a transparent electrode, at least one electrochromic layer (EC-layer), a hydrogen-storing layer, a hydrogen ion-conducting layer, at least one additional electrode, and a rear face which directly follows one of the two electrodes.

Electrochromic materials are materials which change their optical constants (n, k) in response to the application of an electrical field, and which, after the field is switched off, maintain the changed optical state. Moreover, the changed state can be easily reverted to the initial state by reversing the polarity of the electric field. In essence, the electrochromic material is involved in a reversible redox-process.

Typical examples for electrochromic materials are $WO_3$ and $MoO_3$, which, when applied in a thin film to a glass carrier, are colorless and transparent. If, however, a sufficient voltage is applied to such a layer, the latter being positioned between other suitable layers, cations, e.g., hydrogen ions, diffuse from one side and electrons from the other side into this layer, thus forming the blue tungsten- and molybdenum-bronze, $H_xWO_3$ and $H_xMoO_3$, respectively. This case constitutes a field-controlled system; however, diffusion-controlled systems also exist, in which e.g., hydrogen ions (protons) diffuse directly into the $WO_3$-layer from a platinum layer lying behind the $WO_3$-layer. The intensity of the coloration is determined by the amount of charge passed into the layer (field-controlled system) or the number of the hydrogen atoms diffused into the layer (diffusion-controlled system).

Layer-sets manufactured by co-application of electrochromic materials can be used to control and vary optical characteristics, particularly light absorption. Such layer-sets are of considerable interest for use as displays as well as for transparent optical equipment, e.g., spectacles and light valves, as well as for reflecting systems, e.g., mirrors and reflecting displays.

A variety of possible constructions of electrochromical layer-sets by different layer arrangements is described, e.g., in Schott Information 1983, no. 1, page 11, in DE-PS 30 08 768, in Chemistry in Britain, 21 (1985), 643 or in Dechema-Monographien, Volume 102—VCH Verlagsgesellschaft 1986, page 483.

In U.S. Pat. No. 4,465,339, electrochromic mirrors are described as being exclusively constructed from solid layers, thereby gaining certain advantages compared to electrochromic mirrors having liquid electrolytes (described, e.g., in U.S. Pat. No. 3,844,636). Such advantages include, for example, e.g., lower thickness of the entire system, no leaking-out of the acid used as electrolyte of the layer-set is fractured.

It is clear from the prior art that a wide variety of different possibilities exist for the arrangement of the individual layers for the construction of an electrochromic mirror. Consequently, the following sequence of layers (in the direction of view) represents only one example thereof:

glass substrate
transparent electrode
electrochromic layer
solid, hydrogen ion-conducting layer
hydrogen-ion permeable reflector
solid, hydrogen ion-conducting layer
hydrogen ion-storing layer
catalytic layer, simultaneously capable of functioning as an electrode
adhesive
stop plate (also called backing, back face, face pane, sealing face or sealing plate)

If the reflection of the mirror is desired to be decreased, the absorption of the EC-layer is increased by intensifying the color. This is accomplished by switching on the circuit wherein the transparent electrode is connected as the cathode and the electrode disposed behind the hydrogen ion-storing layer is connected as the anode. Hydrogen ions move from the hydrogen ion-storing layer through intermediate layers—said layers being hydrogen-ion permeable and electron impermeable—into the electrochromic layer; and electrons pass directly into the EC-layer from the voltage source via the transparent electrode. In the EC-layer a redox-reaction with the electrochromic material, e.g., $WO_3$, takes place thus forming the blue tungsten-bronze $H_xWO_3$ according to the following formula:

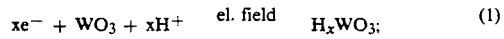
(1)

wherein x represents the extent of reaction, which in turn determines the extent of light absorption of the EC-layer.

Since the electrochromic reaction is reversible, the reaction can be reversed by reversing the polarity of the electric field applied to darken the EC-layer, thereby decolorizing the EC-layer to the extent desired. The electrode arranged directly in front of the back face is switched on to be the cathode, causing the hydrogen ions to be transported back into the hydrogen ion-storing layer in reverse of equation (1), as follows:

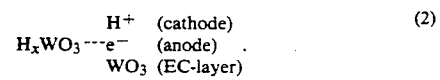
(2)

It is possible during the operation according to equation (2) that protons may reach the cathode where therey are transformed to hydrogen molecules.

At the rear, the system is sealed by a bonded back face made of glass or of bonded or foamed synthetic. The seam between the electrode and the rear face is critical because this seam should prevent the escape of the discharged hydrogen molecules or resultant water molecules after reaction of the hydrogen with oxygen. A major disadvantage of prior electrochromic laminates is that hydrogen is slowly consumed through leakage, the latter being attributable to the prior art constructions or manufacturing technique.

Since the transport of charges necessary for the electrochromic reaction is inseparably linked to mass transfer (in this case by the $H^+$-ions) in order to maintain neutrality, the life of an electrochromic layer-set is inversely dependent on the rate of leakage of hydrogen.

A further impairment of the function of such an EC-layer-set results from the fact that the hydrogen of the layer-set can react (deflagrate) by reacting with ambient oxygen diffusing from the edge through the glued joint, causing the zone of functioning plane of the EC-layer-set to decrease from the edge.

In U.S. Pat. No. 4,465,339, col. 5, lines 27-34, metal face panes, as well as metal solders, are mentioned as possible hermetic seals. However, if the electrochromic layer-set is sealed by a soldered metal plate, it is necessary, on information and belief, to use a solder with a melting point below 100° C., because higher temperatures can be detrimental for the electrochromic layer-set. Under most conditions, e.g., in a car, those solders are unsuitable in view of their low melting point. Conversely, if the metal plate is glued, oxygen can diffuse across the glue-layer.

SUMMARY OF THE INVENTION

It is therefore an object of the present invention to provide improved electrochromic layer-sets of the afore-mentioned kind, which are hermetically sealed at the seam between the electrode and the rear face so as to mitigate or completely prevent any escape of hydrogen or water from the layer set and to prevent oxygen from the outside from diffusing into the side of the electrode facing away from the layer-set.

Another object is to provide processes for producing the improved electrochromic layer set.

Upon further study of the specification and appended claims, further objects and advantages of this invention will become apparent to those skilled in the art.

To achieve such objects, several aspects are involved, each contributing to an improved layer set.

On aspect is to provide an electrochromic layer-set comprising a transparent substrate plate, arranged on the front face of the layer-set, a transparent electrode, at least one electrochromic layer, a hydrogen-storing layer, a hydrogen ion-conducting layer, at least one additional electrode, a catalytic layer being simultaneously capable of functioning as an electrode, a rear face in immediate contact with the catalytic layer, said rear face comprising a metallic layer, said metallic layer hermetically sealing the layer-set.

Another aspect is to provide an electrochromic layer-set comprising a transparent substrate plate arranged on the front face of the layer-set, a transparent electrode, at least one electrochromic layer, a hydrogen-storing layer, a hydrogen ion-conducting layer, at least one additional electrode, a rear face in sealing relationship with the layer-set and in immediate contact with one of the two electrodes, said rear face comprising a metallic layer, said metallic layer having a posterior side facing away from the front face of the layer-set, said posterior side being in the form of an oxide of the metal, thereby increasing the sealing efficiency of the layer-set.

The metallic layer either in front of the rearmost layer or forming the rear face itself generally guarantees an absolutely tight rear seal of the electrochromic layer-set so as to prevent the escape of any gases, especially hydrogen and/or water, and also prevent the diffusion of oxygen, approaching from the outside thereby preventing hydrogen from reacting with same. As a result, the life of the electrochromic layer-set is increased remarkably, for example 2 to 3 times the normal two- to three-year life of a layer-set without the metal layer.

It is highly advantageous for the metallic layer to be applied electrolytically. In this method, the layer-set and a counter-electrode are immersed in an electrolyte containing the ionic form of the metal to be applied, making the electrode lying at the rear of the layer-set, the negative electrode. This method, both convenient and simple, permits the metallic layer according to the invention to be applied uniformly to the entire back of the electrode-surface and especially to the critical places lying near the edges so that they are covered securely. Consequently, during operation of the electrochromic layer-set, no hydrogen and/or water can escape from such critical places and no oxygen from the outside can diffuse into the side of the electrode turned away from the layer-set. This metallic layer is preferably nickel, chromium, aluminium, cadmium, copper, tin, lead, gold, zinc or silver. Nickel and tin are particularly preferred. The thickness is generally greater than 2 microns, preferably 5 to 10 microns. If the layer is too thick, the metal layer induces tensions in the electrochromic layers, which result in the peeling off of some layers.

In case the applied metallic layer does not hermetically seal the layer-set as well as desired or if it is desired to ensure the effectiveness of the seal, it is an aspect of the invention to enhance the quality of the sealing of the layer-set by transforming the side of the metallic layer turned away from the front face (substrate plate) into a metallic oxide after the deposition of the metallic layer. This transformation can be conducted by anodic oxidation, preferably, of the metallic layer or by oxidation with oxygen. The oxidation can in some cases also be affected by treatment of the metallic layer with a solution containing a suitable oxidizing agent, e.g., a solution of hydrogen peroxide or dilute nitric acid for nickel and tin. The oxidized layer has a greater volume than the metal layer, and, without being bound by an explanation of the mechanism by which oxidation seals the layer, it is believed that micropores are closed by the volume increase during oxidation. The depth of the oxidized layer can be about 0.1 to 5 microns, preferably 0.5 to 2 microns, the latter thickness corresponding to about 5% to 40%, preferably 10% to 20% of the preferred thickness of 5-10 microns of the metal layer. The oxides of all metals, used for the metallic layer, will work.

Due to the use of the electrode resting against the rear face of the electrochromic layer-set as a cathode during this electrolysis, only one electrode (anode) need be immersed in the solution containing the metal ions.

It is advantageous to carry out the method for application of the metallic layer in such a way, that the step of charging of the layer-set with the required amount of hydrogen is combined with the electrolytic application of this metallic layer, whereby the hydrogen-charging is conducted before the application of the metallic layer.

When the rear face comprises the metallic layer and a further layer to the rear and in contact with the metallic layer, the further layer can be any conventional stop plate or trailing edge strip, for example, glued glass-plates or plastic-plates or -stripes as well as a thick layer or lacquer, as used in the production of mirrors to protect the back of the metallic layer.

Although it is highly advantageous to electrically apply the metallic layer, other techniques may also be employed while retaining inventive aspects of the invention. For example, a vapor deposited coating oxidized on the posterior side would constitute an improvement.

BRIEF DESCRIPTION OF THE FIGURE

Various other objects, features and attendant advantages of the present invention will be more fully appreciated as the same becomes better understood when considered in conjunction with the accompanying drawing, wherein the drawing is a schematic cross-section of a representative preferred embodiment of the invention.

DETAILED DESCRIPTION OF THE DRAWING

The sequence of layers of the electrochromic layer-set (mirror) shown in the figure corresponds to the above discussed sequence of layers already referred to when describing the prior art.

First, a stratified transparent electrode 2, e.g., an ITO-layer (ITO=indium tin oxide), which could be connected as anode or cathode, is positioned on the thin glass plate 1, serving as a substrate for the additional layers. Behind the electrochromical layer 3 ($WO_3$, $MoO_3$), a solid ion-conducting layer 4 (different oxides or fluorides) is positioned, being manufactured, e.g., by vapor deposition and having a thickness sufficient to render improbable the tunneling of electrons (thickness $\geq 15$ nm). Following thereafter is a hydrogen ion-permeable reflector 5 having the shape of a layer consisting essentially of e.g., palladium, platinium, rhodium, a palladium-silver alloy or a functionally equivalent alloy. In the case it does not function as an electrode, contrary to the present case, the reflector 5 can be formed as a dielectric mirror. The layer-system is completed by another solid-ion-conducting layer 6 as well as a hydrogen ion-storing layer 7, which, in the present case, emits hydrogen ions when darkening the EC-layer and captures them during the brightening phase (e.g., a layer of the system $WO_3/H_xWO_3$) and by a catalytic layer 8, being capable of serving simultaneously an electrode. The layer 8, serving as an electrode, does not have to be catalytically active in the present case because molecular hydrogen is generated from the electrolyte.

The catalytic layer or catalytic electrode, respectively, is a layer consisting of a suitable metal capable of absorbing molecular hydrogen from a hydrogen containing atmosphere and decomposing it into atomic hydrogen.

The entire electrochromic layer-set is completed by the rear metallic layer 9 according to the invention, which hermetically seals the layer-system so as to guarantee that at least where it is sealed that neither hydrogen nor its reaction product water can leave the system and that no outside oxygen can diffuse into the side of the electrode 8 posterior to the layer-set.

It is possible but not necessary to apply a stop plate 11 to the metallic layer by means of an adhesive 10 to protect it from injury and damage from mechanical stress, etc.

It is important to appreciate that the sequence of layers described above is only one possible variant; as to the other sequences of layers and layer-variants for the construction of an electrochromic mirror, reference is made to the prior art, e.g., that previously mentioned. Moreover, the present invention will be applicable as well to future sequences and variants, so long as the teachings of the invention are employed.

To simplify matters, all layers as well as the plate 1 (substrate) and the stop plate 11 are shown in the drawing as having about the same thickness. In reality the thickness of plate 1 (thickness=1 to 2 mm) and the stop plate 11 (thickness=1 to 3 mm) amounts to a multiple of the entire thickness (thickness=2 to 5 microns) of the layers lying between. These thicknesses are merely examples and should serve only for illustration, but if the thickness of the plate 1 is too great, disturbing echo images may occur.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

In the foregoing and in the following example, all temperatures are set forth uncorrected in degrees Celsius and unless otherwise indicated, all parts and percentages are by weight.

The entire texts of all applications, patents and publications, if any, cited above and below, and of corresponding application German P. 37 36 075.2, filed Oct. 24, 1987, are hereby incorporated by reference.

EXAMPLE

An electrochromic mirror with an electrode on the rear side consisting of a palladium-layer of a thickness of 50 nm was submerged in a stirred aqueous solution containing 30 g $SnSO_4/l$ and 14 g $H_2SO_4/l$, having a temperature of 25° C. The palladium layer was the cathode and a strip of Sn was anode; the electro-deposition of Sn on the Pd-layer was carried out for 3 min with a current of 20 mA/cm$^2$, giving a Sn-layer of 3 micron thickness.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An electrochromic layer-set comprising a transparent substrate plate, arranged on the front face of the layer-set, a transparent electrode, at least one electrochromic layer, a hydrogen-storing layer, a hydrogen ion-conducting layer, at least one additional electrode, a catalytic layer being simultaneously capable of functioning as an electrode, a rear face in immediate contact with the catalytic layer, said rear face comprising a metallic layer, 2. An electrochromic layer set according to claim 1, wherein the electrolytically deposited metallic layer comprises tin or nickel. said metallic layer being an electrolytically deposited metallic layer and hermetically sealing the layer-set.

3. An electrochromic layer set according to claim 1, wherein the electrolytically deposited metallic layer has a thickness of 5-10 microns.

4. An electrochromic layer set according to claim 2, wherein the electrolytically deposited metallic layer has a thickness of 5-10 microns.

5. A process of electrolytically sealing an electrochromic layer-set comprising immersing the electrochromic layer-set and a counter-electrode in a solution of metal ions, said layer-set comprising an electrode at one end functioning as a negative electrode, said counter-electrode functioning as a positive electrode, and electrolytically depositing a metal layer from said metal ions, said metal layer being deposited on said negative electrode in a sufficient depth to seal the electrochromic layers set to prevent hydrogen and water from leaking from said layer-set and to prevent ambient oxygen from diffusing out the layer-set which would otherwise react with hydrogen.

6. A process according to claim 5, said metal layer having a posteriod side facing away from the electrochromic layer-set, and further comprising oxidizing said posterior side.

7. A process according to claim 5, wherein the electrolytically deposited metallic layer comprises tin or nickel.

8. A process according to claim 7, wherein said electrolytically deposited metallic layer has a thickness of 5-10 microns.

9. A process according to claim 6, wherein said metallic sealing layer comprises nickel or tin.

10. A process according to claim 9, wherein said metallic sealing layer has a thickness of 5-10 microns.

11. A process of improving the sealing of an electrochromic layer-set having a metal sealing layer, said metal layer having a posterior side facing away from the electrochromic layer-set, said process comprising oxidizing said posterior side of said metal layer.

12. A process according to claim 11, wherein said metallic sealing layer comprises nickel or tin.

13. A process according to claim 12, wherein said metallic sealing layer has a thickness of 5-10 microns.

14. An electrochromic layer-set comprising:
   a transparent substrate plate arranged on the front face of the layer-set, a hydrogen ion-conducting layer, a first electrode, and an electrochromic layer arranged between said transparent substrate plate and said hydrogen ion-conducting layer; and
   a hydrogen-storing layer and a second electrode separated from said first electrode and said electrochromic layer by said hydrogen ion-conducting layer; rearward of said layers, a first catalytic metallic layer capable of absorbing molecular hydrogen from a hydrogen-containing atmosphere and decomposing said molecular hydrogen into atomic hydrogen; and, in immediate contact with and rearward to said first catalytic layer, a second metallic layer, as a rear face hermetically sealing the layer-set, said second metallic layer being an electrolytically deposited layer.

15. A layer-set according to claim 14, wherein said first catalytic metallic layer is said second electrode.

16. A layer-set according to claim 14, wherein a stop plate is mounted on said second metallic layer.

17. An electrochromic layer-set according to claim 14, wherein said second metallic layer is nickel or tin.

18. An electrochromic layer-set according to claim 17, wherein said second metallic layer has a thickness of 5 to 10 microns.

19. An electrochromic layer-set having an electrolytically deposited metal sealing layer of 5 to 10 microns.

20. An electrochromic layer-set according to claim 19, wherein the metal sealing layer comprises nickel or tin.

* * * * *